D. BOŽIĆ.
COMPRESSED AIR CONTINUOUS BRAKE SYSTEM FOR PASSENGER OR FREIGHT TRAINS.
APPLICATION FILED MAR. 1, 1922.

1,420,237.

Patented June 20, 1922.

Inventor
Dobrivoje Božić
By Henry Ost Jr.
Atty.

D. BOŽIĆ.
COMPRESSED AIR CONTINUOUS BRAKE SYSTEM FOR PASSENGER OR FREIGHT TRAINS.
APPLICATION FILED MAR. 1, 1922.
1,420,237.
Patented June 20, 1922.
2 SHEETS—SHEET 2.
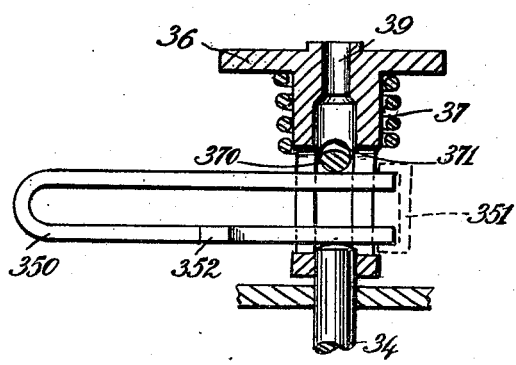
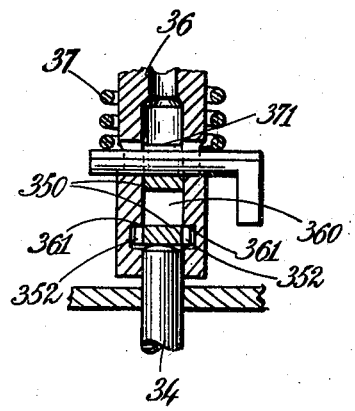
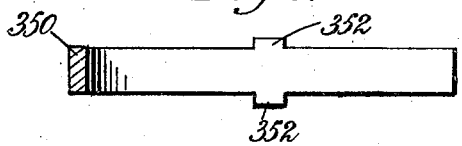
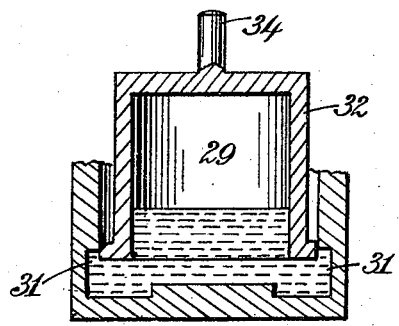
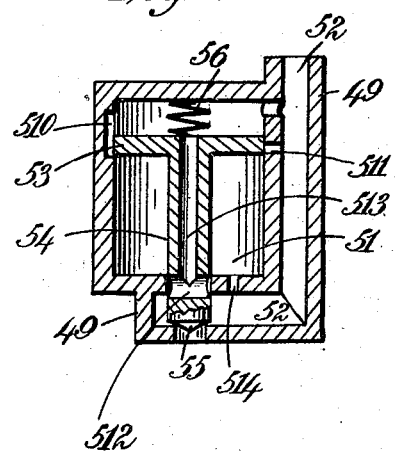

_UNITED STATES PATENT OFFICE._

DOBRIVOJÉ BOŽIĆ, OF BELGRADE, JUGO-SLAVIA.

COMPRESSED-AIR CONTINUOUS BRAKE SYSTEM FOR PASSENGER OR FREIGHT TRAINS.

1,420,237.   Specification of Letters Patent.   Patented June 20, 1922.

Application filed March 1, 1922. Serial No. 540,299.

*To all whom it may concern:*

Be it known that I, DOBRIVOJÉ BOŽIĆ, a subject of the King of Jugo-Slavia, residing at Skadarska ulica 39, Belgrade, Jugo-Slavia, have invented a certain new and improved Compressed-Air Continuous Brake System for Passenger or Freight Trains, of which the following is a specification.

The present invention relates to a compressed air continuous brake system, and has for its object to provide means applicable to already existing compressed air brakes, of passenger or freight trains, and permitting of obtaining the following results:—

1st. The moderateable and progressive application and taking off of the brake.

2nd. The proportioning of the braking effort to the variable loading of freight cars.

3rd. Great speed of propagation of the braking from the head to the tail of the train, and from the tail to the head.

4th. Automatic feed of the auxiliary reservoirs and brake cylinders even upon the longest and steepest gradients and during the whole period of the braking.

5th. Pressure in the brake cylinders independently of the position of the piston in its stroke, or of the wear of the brake shoes, or of loss of fluid-tightness, or of the relation between the brake cylinder and the auxiliary reservoir.

6th. The possibility of utilizing the principal reservoirs and the air pumps of two locomotives under the control of the engineer's valve of only one of them.

7th. Pre-determined pressure in the general pipe whatever may be the pressure in the principal reservoirs or the loss of air, even during the braking.

8th. The possibility of interposing freight cars in a train of passenger vehicles and vice versa.

Different means for carrying out the objects of the invention are illustrated in the accompanying drawing, in which:—

Figure 6 is a central vertical section of another modification applicable to the distributor.

Figure 7 is a central vertical section taken in a plane at right angles to Figure 6.

Figure 8 is a plan of the forked spring device which is seen in elevation in Figure 6.

Figure 9 is a vertical section of a modification in connection with the piston, and liquid chamber of the distributor, seen in Figure 2 or Figure 3.

Figure 10 is a central vertical section of another form of accelerator.

Figure 1:
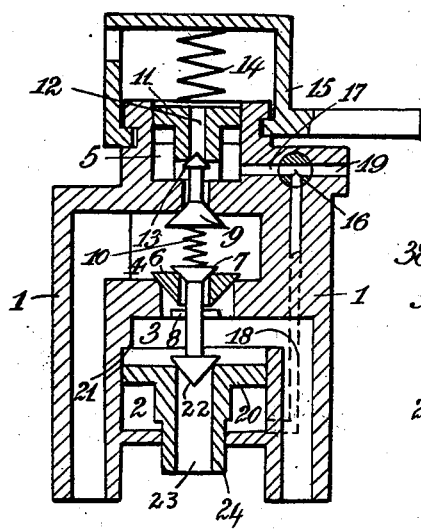
Figure 1 is a vertical section of an engineer's valve.

The engineer's valve comprises four chambers 2, 3, 4 and 5, formed in a body or casing 1. The chamber 4 communicates freely with the principal reservoir placed upon the locomotive, and communicates with the chamber 3 through the medium of a valve 6 which rises to open, a double valve 7—22 passing through an aperture in the valve 6 and also rising to open. Furthermore, the chamber 4 can communicate with the chamber 5 through the medium of the double valve 9—13 which descends to open. The valves 9, 7 and 6 are moved to the closed position by means of the spring 10.

The chamber 5 is shut off from the atmosphere by the piston 11, the latter being pierced with a passage 12 which is closed by a valve 13. A spring 14 bearing against the upper wall of the hub of the handle 15 presses the piston 11 upon the valve 13.

A cock 16 permits of putting the chambers 5 and 2 into communication through the passages 17 and 18 while at the same time shutting them off from the atmosphere; or, when turned to the position seen in Figure 1, it connects them through the passage 19 with the corresponding chambers of the same kind of valve on another locomotive, in the case of a train which is hauled by two coupled locomotives.

The chambers 2 and 3 are separated by the piston 20, a valve 22 closing a central passage 23 for conducting atmospheric air to the chamber 3 through the rod part 24 of the piston 20, the said rod part 24 sliding air-tightly through an aperture in a wall of the body or casing 1.

The chamber 3 communicates permanently with the main pipe.

With these elements as above described, the engineer's valve functions in the following manner:—

The handle 15 screws on the body 1 and in the position in which it is unscrewed to its limit it does not act upon the spring 14, and, consequently, it has no action upon the piston 11. The valve 9 is pressed against its seat by the pressure in the chamber 4 due to the principal reservoir. For the same reason, the valves 7 and 6 are also closed. The piston 20 rests with a shoulder of its rod part against the lower wall of the chamber 2 and the valve 22 is then open.

If the handle 15 is now screwed down, the spring 14 acts upon the piston 11 which presses upon the valve 13 so as to open the valve 9. The compressed air from the principal reservoir then passes into the chamber 5 until the pressure upon the piston 11 becomes superior to the effort of the spring and raises the piston for permitting the valve 9 to close.

By unscrewing the handle 15, the compression of the spring 14 is diminished and the pressure upon the piston 11 raises the latter and opens the valve 13 until the pressure in the chamber 5 has been lowered sufficiently for enabling the spring to press back the piston and close the valve 13.

The pressure in the chamber 5 corresponding with the position of the handle 15 of the control valve depends entirely upon the characteristics of the make of the spring 14 and upon the effective surface area of the piston 11. Owing to the cock 16, when the latter is turned clockwise through 90° from the position shown, the same pressure will always exist in the chambers 5 and 2. This pressure exerts a lifting effort upon the piston 20 for first of all closing the valve 22 and then successively opening the valves 7 and 6. The valve 7 may after a small movement carry with it the valve 6 by means of a stop 8. The compressed air of the principal reservoir passes into the principal conduit 18 until the effective pressure upon the upper face of the piston 20 slightly exceeds the effort exerted by the pressure in the chamber 2 whereupon the piston 20 is forced down again.

It is to be noted that the valves 7 and 6 could be united in a single valve but the double valve arrangement gives the advantage of a very large opening at the commencement of the feed to the main pipe.

If for any reason and not by the will of the engineer the pressure is lowered in the main pipe and consequently in the chamber 3, the piston 20 rises again because the pressure in the chamber 2 has not varied the valve 22 remains closed but the valve 7 opens or the two valves 6 and 7 open and admits or admit the air of the principal reservoir into the main pipe until the initial pressure is restored in the chamber 3.

As a result the pressure in the main pipe depends solely upon the pressure in the chambers 2 and 5 and consequently upon the position of the handle 15.

The distributor or triple valve (Figure 2) comprises a fluid-tight body or casing 25 in which are disposed four chambers 26, 27, 28 and 29. The chamber 26 communicates freely with the auxiliary reservoir provided on each vehicle to be braked, the chamber 27 communicates with the brake cylinder and the chamber 28 communicates with the main pipe.

The chambers 26 and 28 can communicate with one another by means of the valve 30 which rises to open. An orifice 31 gives communication between the chambers 28 and 29 when the piston 32 is in the lowest position. This piston is guided by its rod 34 and slides with a little play or loose fit in the bore of the chamber 29. A circular rib or shoulder 33 forms a stop for the piston 32 in its ascent. A liquid such as oil in which the piston 32 is immersed isolates the lower part of the chamber 29 from the upper part containing the compressed air. The rod 34 of the piston 32 extends into the atmosphere and passes fluid-tightly through the wall of the casing 25. This rod 34 comes against the lever 35 which acts upon the piston 36 either directly or by compression of two springs 37 and 38 having different characteristics. The faces of the lever 35 in contact with the springs aforesaid are of an appropriate profile so that by their angular displacements around the axis of the rod 34 or around a pivot axis of the lever it is possible to cause the projections of the faces to act in the following order:

1st upon the rod of the piston 36.
2nd upon the spring 37, and after sufficient compression thereof upon the piston 36.
3rd upon the spring 37 and after sufficient compression upon the spring 38.
4th at the same time upon the springs 37 and 38.

The passage 39 formed in the rod of the piston 36 is closed by the valve 42 connected with the valve 43 controlling the communication between the chambers 26 and 27, these two valves opening by rising. A collar 45 hinders the passage of air from the chamber 26 to the chamber 27 when the valve 43 is slightly opened. The chamber 29 is connected by a duct with a cushioning chamber $29^a$ into which the oil or liquid aforesaid can be pressed as will appear.

The distributor just described functions in the following manner:

When a pressure is produced in the main pipe and consequently in the chamber 28, the piston 32 descends to its lower extreme position thereby uncovering the orifice 31 which will then be above the upper face of the piston 32. The oil is then pressed back through the orifice in the chamber 29 and will rise in the chamber $29^a$ and this movement of oil continues until the compressed air within the chamber $29^a$ is equal to the pressure within the chamber 28.

The valve 30 remains open until equilibrium is established between the chambers 26 and 28, that is to say between the main pipe and the auxiliary reservoir.

Moreover, the piston 32 being in its extreme lower position, the piston 36 follows it in its descent and opens the valve 42.

If there is now a slight lowering of pressure produced in the main pipe, the valve 30 remains closed whilst the piston 32 re-ascends in the chamber 29 in accordance with the pressure existing in that chamber until finally the piston is arrested by the rib 33. The rod 34 operates through the medium of the lever 35 upon the piston 36 either directly or through the medium of one or both of the springs 37 and 38 according to the position of adjustment of the lever as explained above.

The valve 42 then closes and consequently the valve 43 opens and places the brake cylinder into communication with the auxiliary reservoir until such time as the pressure causes the piston 36 to re-descend under an effort superior to the upward effort exerted vertically by the piston 32. The valve 43 then closes and interrupts the communication between the brake cylinder and the auxiliary reservoir.

If the lever 35 is in the first position so that it acts directly on the piston 36 the valve 43 remains open each time. Each time that the pressure is lowered in the main pipe a further augmentation of the pressure in the brake cylinder is effected until the pressure in the latter is equal to the pressure in the auxiliary reservoir.

The oil in the lower part of the chamber 29 flows only slowly around the loose fitting piston 32 so that the pressure in the chamber 29 is maintained during an appreciable period of time.

In the second position of the lever 35 in which it acts against the spring 37 and only eventually against the piston 36 when the pressure upon the piston 36 is superior to the tension of the spring 37 the piston 36 descends until there is direct contact between its rod and its lever. The piston 32 remains stationary and only commences its descent when the pressure that it receives from the piston 36 is superior to the effort due to the pressure existing in the chamber 29.

The collar 45 has for its object to limit the speed of passage of the compressed air from the auxiliary reservoir into the brake cylinder in order to obtain a gradual application of the brake.

After equalization of the pressures between the auxilary reservoir and the brake cylinder the piston 32 remains in contact with the stop 33.

In the third position of the lever 35 wherein the latter acts first against the spring 37 and eventually against the spring 38, the same action of the pistons and valves produces results analogous with those described in the preceding case; after compression of the spring 37 the lever 35 acts upon the spring 38 and the pressure in the chamber 27 can only be augmented if the tension of the spring 38 in the new position is overcome. The piston 36 can then descend without affecting the piston 32 and without its rod coming into contact with the lever 35. The valve 43 closes and the increase of pressure in the brake cylinder ceases completely whatever may be the reduction of pressure in the main pipe or the pressure in the auxiliary reservoir. In the fourth position of the lever 35, that is to say, when it acts at once against both of the springs 37 and 38 the valve 43 remains open until the effort due to the pressure upon the piston 36 is superior to the effort due to the compression of the springs 37 and 38. These springs are compressed and the valve 43 closes without the piston 32 descending.

If the pressure in the brake cylinder is diminished from any cause not in accordance with the will of the engineer the effort of the piston 32 or of the springs 37 and 38 causes the piston 36 to re-ascend and open the valve 43 until the initial pressure in the brake cylinder is re-established.

In all cases the pressure in the brake cylinder depends only upon the reduction of pressure in the main pipe and upon the position of the lever 35.

The wearing of the brake shoes, faults in the airtightness and the stroke of the piston connected with the operating mechanism are without influence upon the pressure in the brake cylinder. Moreover the maintenance in the auxiliary reservoir of a pressure at least equal to that in the main pipe is automatically obtained by the valve 30 even during braking.

If the pressure is augmented in the main pipe and consequently in the chamber 28 the pistons 32 and 36 descend until the collar 41 comes down upon the external wall of the chamber 28 in which position the piston 32 should then close the orifice 31. The air from the brake cylinder then escapes to the exterior by the duct 39 which is opened by the valve 42 until the diminished pressure within the chamber 27 permits the assemblage of pistons 32 and 36 to rise again for closing the valve 42. The passage of the air through the duct 39 is partly obstructed by the wings of the part 40 and the cross section for the flow is so much greater as the spring 37 is less compressed.

If the pressure in the chamber 29 is released by any suitable valve, the brake cylinder is also completely exhausted without emptying the auxiliary reservoir. In place of the lever 35 it is possible to employ a double branch spring having a primary compression which should be restrained the spring being compressed beyond its primary compression and the valve 43 completely closed when the maximum braking is attained. It is possible to connect this spring with the suspension springs of the vehicle to proportion the maximum braking force to the variable load of a goods wagon. This double branch spring 350 is seen in Figures 6 to 8. Its primary compression is brought about by the hook device 351. The spring can be moved horizontally and also slightly in the vertical direction in the opening 360 in the piston. Its lower branch is in contact with a rod 34 and its upper branch in rising comes into contact with the bolt 370 passing through the body of the piston 36 in a transverse slot 371 of larger dimensions and holding the spring 37 in compression.

The lower branch has two projections 352 which when the spring is moved sufficiently towards the right hand come beneath the stop surfaces 361 of the piston 36. In this position of the spring 350 the piston 32 acts directly against the piston 36 as in the first position of the lever 35 of Figure 2. As soon as the pressure in the chamber 27 against the piston 36 exceeds the primary compression of the spring 37 the latter is then further compressed until the upper part of the slots 371 comes against the bolt 370. The spring 350 can be connected with the intermediate apparatus such as the automatic regulating valve for diminishing the braking force, this apparatus retracting the spring towards the left hand when the speed of the train diminishes.

Figure 3:
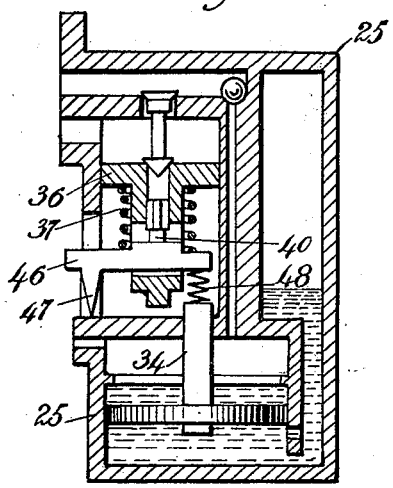
Figure 3 is a different form of distributor.

It is also possible to replace the lever 35 by a lever 46, Figure 3, having a fulcrum point 47 and bearing with its other extremity against the rod of the piston 32 through the medium of a spring 48 having initial compression.

The fulcrum point 47 can be moved at will more or less towards the axis of the piston 36 or the lever may be connected by any suitable means with the suspension springs of a vehicle. As the relative positions of the three active points of the lever can be changed, the spring 38 of the preceding example is no longer necessary. In either case, the levers 35 and 46 can be connected with the suspension springs in order to obtain a pressure in the brake cylinder proportional to the loading of the vehicle or the position of the lever may be adjusted by hand to correspond with the loading of the vehicle.

Figure 4:
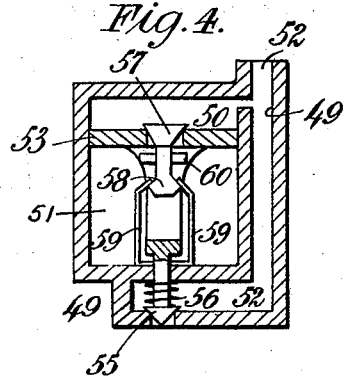
Figure 4 is a vertical section of the accelerator.

The upper part of the chamber 29 containing the compressed air cushion can be constituted in the piston 32 in the form of a bell such as is represented in Figure 9. The partial accelerator and repeater, seen in Figure 4, comprises a principal body or casing 49 in which are superposed two chambers 50 and 51 separated by a piston 53. The chamber 50 is in permanent communication with the main pipe through the duct 52.

A valve 57 rising to open permits of communication between the chambers 50 and 51. The rod 54 of the piston 53 passes through the bottom of the chamber 51 and carries a valve 55 opening or closing a port in the duct 52 to atmospheric air. A spring 56 retains that valve upon its seat.

Figure 5:
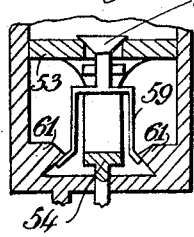
Figure 5 is a different form of control means of the valves of this accelerator.

The valve 57 has at the extremity of its rod a device of mushroom formation, this device being constituted by two truncated cones joined together by their large bases. A spring 59 having two vertical branches with the extremities bent to conform with the inclination of the upper cone holds the valve 57 upon its seat. If this valve is displaced vertically upwards the branches of the spring 59 slide upon the upper cone and then exert a pressure upon the lateral surfaces of the lower cone thereby sharply accentuating the rising movement of the valve 57. The same result may be attained by making the spring fixedly connected with the valve and forming the surfaces of opposite conicity in the bottom of the chamber 51 as at 61, as seen in Figure 5.

With the parts thus described and with the piston 53 in its extreme lower position that is to say with the valve 55 closed the slow gradual reduction of pressure in the main pipe is followed by a slow gradual establishment of equilibrium between the main pipe and the chamber 51, because the piston is not tight and can be even perforated with a hole of small diameter and in these circumstances the accelerator does not fulfil its function.

In the case of a sharp reduction of pressure in the main pipe the piston 53 is raised and opens the valve 55. The main pipe being then open to the atmosphere or to the brake cylinder the pressure within it is sharply lowered from the head to the tail of the train.

The piston 53 continuing to rise from the time of the accentuated depression due to the opening of the valve 55 carries with it the valve 57 until the elastic blades 59 after sliding upon the upper cone exert a pressure upon the lower cone thereby sharply opening the valve 57. Equilibrium is then established between the chambers 50 and 51, the piston 53 descends again under the pull of the spring 56 and closes the valve 55 after having produced a partial depression in the conduit. The accelerator is now ready to function if the sharp depression is continued or is produced anew. The depression which is produced is not dependent upon the capacity of the main pipe as in the case of accelerators employed heretofore. Some of these accelerators disposed upon the main pipe of a train of vehicles will suffice for rapidly propagating from the head to the tail of the train a depression which will ensure a sharp application of the brakes.

A modification of the accelerator is illustrated in Figure 10. The same piston 53 and valve 55 with spring 56 mounted in a casing 49 are employed. The chamber 51 can communicate with the chamber 50 or with the conduit 52 by the groove 510 or by the port 511 in the casing 49 or by the port 512 and passage 513 in the rod 54 when the piston has risen a little; these ways of communication can be opened a little even when the piston is in its lowest position.

The port 514 between the chamber 51 and the duct have the same object.

The operation is the same. As soon as the wave or impulse of depression or pressure variation reaches the chamber 50, the piston 53 rises and opens the valve 55 thereby letting the compressed air in the conduit escape to the atmosphere or to the brake cylinder. As soon as the pressures above and below the piston 53 are equalized by the ways described above, the piston re-descends and closes the valve 55.

The motive force of the piston 53 is rather a wave or impulse than a detaining pressure.

Figure 2:
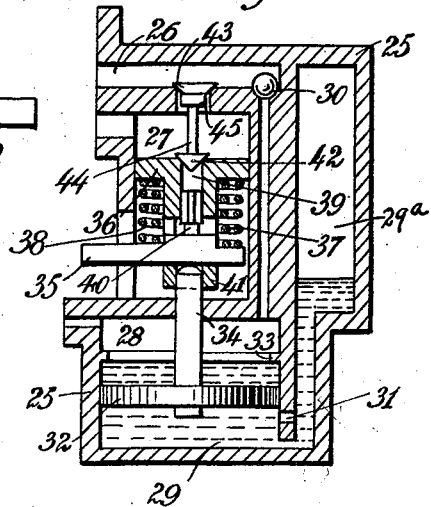
Figure 2 is a similar view of a distributor.

The means above described ensure in existing systems the continuous and automatic braking by compressed air of passenger or goods trains and permit of obtaining the moderateable and gradual application and removal of the brakes. They also permit of obtaining a braking effect proportioned to the variable weight of a goods wagon and a great speed of propagation of braking from the head to the tail of the train and from the tail to the head in order to avoid the shortening of the train of vehicles during braking and objectionable shocks. They also provide an automatic feed of the auxiliary reservoirs and of the brake cylinders even upon the longest and steepest gradients and during the braking and so that the pressure in the brake cylinders is independent of the stroke of the pistons or of the wear of the brake shoes or of losses by faults in the fluid-tightness. The said means also enable the principal reservoirs and the pumps of two locomotives to be under the control of the engineer's valve of only one of them and provide for a pre-determined pressure in the main pipe whatever may be the pressure in the principal reservoirs and whatever may be the loss of air. With the aforesaid means moreover it is quite possible to interpose goods wagons in a passenger train and vice versa. With reference to Figures 2 and 3 it may be noted that the pressure in the brake cylinder will always be maintained proportionally to the difference of the pressures on the liquid piston in the chamber 29 by the play of the double valve 42 and 43 connecting the brake cylinder to the reservoir or the atmosphere.

Accelerator means such as herein described and disposed at the rear end of the train may be arranged to produce a greater lowering of pressure than other accelerators on the train in order to produce a fresh lowering of pressure extending from the rear to the front of the train and thereby avoid shocks due to shortenings of the train during braking.

The device 35 in Figure 2 may be a rod device rotatably adjustable about its own longitudinal axis, instead of an arm capable of being turned as a lever as above described.

I claim—

1. In a brake system of the character described, an engineer's valve comprising a primary piston, a variable loading spring for operating the piston against pneumatic pressure, a secondary piston controlled by the operation of the primary piston, a valve mechanism controlled by the secondary piston for the admission or exhaust of air to or from the train pipe for the regulation of pressure in such pipe, and valve mechanism in operative relation with the primary piston adapted for governing admission of main reservoir pressure to the chamber of the primary piston for balancing the spring loading.

2. In a brake system of the character described, an engineer's valve comprising a casing having a principal reservoir chamber, a train pipe chamber, and two control chambers having a direct connection whereby substantially the same pressure is maintained in the latter chambers, pistons in the control chambers, valve mechanism disposed between the principal reservoir chamber and the train pipe chamber and controlled by the piston in the control chambers which is influenced by the difference between the pressure in the train pipe chamber and in the control piston chambers, an atmosphere valve co-operating with the last mentioned piston for relieving the train pipe pressure when the latter predominates, a variable loading spring under control of the engineer for governing the admission of compressed air from the principal reservoir chamber to the control piston chambers, the control piston in the second of said chambers being influenced by the pressure admitted against the action of the loading spring.

3. In a brake system in accordance with claim 1, providing an operative connection between the atmosphere valve and the pilot valve controlling initial communication between the principal reservoir chamber and the train pipe chamber in advance of its associate main valve, said atmosphere valve effecting opening of said pilot valve when train pipe pressure is reduced.

4. In a brake system in accordance with claim 3, the arrangement according to which the pilot valve is seated in a duct formed in its main valve, the pilot valve having lost motion means for the successive opening of said main valve.

5. In a brake system in accordance with claim 1, the provision of an adjustable loading spring operative upon the other control piston, which latter is influenced by the difference between the effort of such spring and the effective pressure of air admitted from the principal reservoir chamber to the chamber of such other control piston, such admission of air being dependent upon the movement of a valve device influenced by the pressure of said piston and the pressure in the principal reservoir chamber.

6. In a brake system in accordance with claim 5, providing an operative connection between said valve device and an atmosphere valve seated in an atmosphere duct in said other control piston.

7. In a brake system in accordance with claim 1, the provision of a two-way control in a connecting duct between the control piston chambers, one way of said control being alignable with said duct only and the other way of said control being alignable with said duct and a passage giving communication with a similar duct in a similar engineer's valve on a second locomotive.

8. In a brake system of the character described, an engineer's valve, a distributor having a control chamber communicating with the train pipe of the system, a cushion chamber in the distributor, a piston in the control chamber influenced by the difference between the train pipe and cushion chamber pressures, a chamber in the distributor communicating with the brake cylinder of the system, a valve in the latter chamber for governing pressure conditions in the brake cylinder, and adjustable control means influenced by the control piston for operating the last named valve in accordance with the adjustment of said means.

9. In a brake system in accordance with claim 8, forming the cushion chamber within the control piston of the distributor, said piston being made of bell-form for the purpose.

10. In a brake system in accordance with claim 8, the provision of a communication port which is uncovered by the control piston when the latter reaches its lowest position, said port then giving free communication between the cushion chamber and a space containing train pipe pressure.

11. In a brake system in accordance with claim 8, the provision of a second piston adapted for operating the valve control means, adjustable means being interposed between the two pistons and formed with different operating surfaces for operating the control valve in different degrees according to the setting of the lever device.

12. In a brake system in accordance with claim 11, the provision between the adjustable means and the second piston of one or more springs having initial compression, the said springs being adapted for permitting of relative motion between such piston and lever before direct operative contact is made between them.

13. In a brake system in accordance with claim 11, the employment of a forked spring device as the adjustable means which are interposed as stated.

14. In a brake system in accordance with claim 13, the provision on the lower arm of the forked spring device of projections adapted in a certain position of adjustment of the said device for positively engaging with the rod of the second piston, to give direct connection between the two pistons.

15. In a brake system in accordance with claim 11, the arrangement of the second piston out of axial alignment with the first and the provision of a lever device with an adjustable point of fulcrum for operatively inter-connecting the two pistons 16. In a brake system of the character described, an engineer's valve, distributor valves, an accelerator piston, a pressure equalizing valve in the accelerator piston, said equalizer valve being seated towards the enclosed chamber and opening to equalize pressure between the train pipe and enclosed chamber, and a snap device operative on the valve upon pre-determined rising or falling of the piston for snapping said valve into the open or closed position as the case may be.

DOBRIVOJÉ BOŽIĆ.